US012180775B1

(12) United States Patent
Kwon

(10) Patent No.: US 12,180,775 B1
(45) Date of Patent: Dec. 31, 2024

(54) STOPPER DEVICE OF DOOR CLOSER

(71) Applicant: WORLDCROSS CO., LTD., Daegu (KR)

(72) Inventor: Young Mo Kwon, Daegu (KR)

(73) Assignee: WORLDCROSS CO., LTD., Daegu (KR)

( * ) Notice: Subject to any disclaimer, the term of this patent is extended or adjusted under 35 U.S.C. 154(b) by 0 days.

(21) Appl. No.: 18/203,116

(22) Filed: May 30, 2023

(51) Int. Cl.
*E05F 3/00* (2006.01)
*E05F 3/22* (2006.01)

(52) U.S. Cl.
CPC .................................... *E05F 3/221* (2013.01)

(58) Field of Classification Search
CPC ........................................................ E05F 3/221
See application file for complete search history.

(56) References Cited

U.S. PATENT DOCUMENTS 1,475,581 A * 11/1923 Henry ........................ E05F 3/06 16/80
1,687,009 A * 10/1928 Drexler ................... E05F 3/221 16/49
3,144,267 A * 8/1964 Schmid ................... E05C 17/28 16/49
3,164,404 A * 1/1965 Arnold .................... E05C 17/28 292/201
3,259,936 A * 7/1966 Sheridan ................. E05C 17/32 74/532
3,771,823 A * 11/1973 Schnarr ................... E05C 17/28 292/270
3,986,742 A * 10/1976 Heaney ................... E05C 17/28 16/86 A
4,069,544 A * 1/1978 D'Hooge ................ E05F 3/222 16/49
4,130,913 A * 12/1978 Rodseth .................. E05F 3/221 16/49
4,491,355 A * 1/1985 Marinoni ................ E05C 17/34 16/334
4,759,099 A * 7/1988 Morano .................. E05F 3/102 16/64
4,878,265 A * 11/1989 Nesbitt ............... E05B 47/0603 292/262
5,152,029 A * 10/1992 Pai ............................ E05F 3/20 16/54
5,335,396 A * 8/1994 Dolan ..................... E05C 17/30 292/262
5,630,248 A * 5/1997 Luca ....................... E05F 3/221 16/49

(Continued)

FOREIGN PATENT DOCUMENTS

KR 20190023124 3/2019

*Primary Examiner* — Jason W San
(74) *Attorney, Agent, or Firm* — IPLA P.A.

(57) ABSTRACT

A stopper device includes: a guide rail in which a sliding portion is formed inside in order that transfer apparatus and fixing apparatus are positioned and slide and a side cap is coupled at both ends in order that the transfer apparatus and fixing apparatus positioned at the sliding portion do not deviate, the transfer apparatus in which an arm connection portion to which one side of an arm connected to the door closer is connected and a roller to which a clip of the fixing apparatus is connected and fixed are formed and which slides along the arm rotating by opening and closing of the door.

2 Claims, 5 Drawing Sheets

(56) References Cited

U.S. PATENT DOCUMENTS

| | | | | |
|---|---|---|---|---|
| 5,829,508 | A * | 11/1998 | DeBower | E05F 3/221<br>160/3 |
| 6,134,751 | A * | 10/2000 | Carrier | E05D 15/44<br>49/342 |
| 6,253,417 | B1 * | 7/2001 | Rusiana | E05C 17/28<br>16/85 |
| 6,499,185 | B1 * | 12/2002 | Moyer | E05F 3/222<br>16/51 |
| 6,643,896 | B2 * | 11/2003 | Carrier | E05D 15/44<br>49/248 |
| 6,979,065 | B2 * | 12/2005 | Egger | A47B 88/467<br>312/319.1 |
| 7,444,713 | B2 * | 11/2008 | McKinney | E05F 3/102<br>16/49 |
| 8,032,989 | B2 * | 10/2011 | Liang | E05D 15/30<br>16/362 |
| 9,863,177 | B2 * | 1/2018 | Zimmer | E06B 3/4636 |
| 11,680,434 | B1 * | 6/2023 | Marovets | E05F 3/104<br>16/53 |
| 2005/0125947 | A1 * | 6/2005 | Kral | E05F 5/003<br>16/67 |
| 2010/0071269 | A1 * | 3/2010 | Isley | E05D 15/44<br>49/404 |
| 2012/0079680 | A1 * | 4/2012 | McRoskey | E05F 5/003<br>16/83 |
| 2013/0000208 | A1 * | 1/2013 | Roberts | E05F 3/221<br>16/85 |
| 2017/0198506 | A1 * | 7/2017 | Sowter | E05F 3/221 |
| 2021/0071457 | A1 * | 3/2021 | Seppänen | E05F 3/221 |
| 2022/0162894 | A1 * | 5/2022 | Seppanen | E05F 1/006 |

* cited by examiner

STOPPER DEVICE OF DOOR CLOSER

BACKGROUND

The present disclosure relates to a stopper device of a door closer, and more specifically, a stopper device of a door closer configured to stably maintain a state of door opening and thus smooth a consequential action, in a door closer installed for automatically closing an open door after opening a door and then entering or exiting.

In general, a door of a building has a role of distinguish a certain space and that a human or an object enters and exits the space, wherein there are many types according to its use. This door is opened and closed by pushing or pulling the door with certain power in order that a visitor opens the door and enters or exits. In a process of using in this way, cases of causing safety accidents frequently occurs because a hand is caught between the door and a door frame. Thus, use of a door closer which slowly closes the door is encouraged.

Also, in a case of an open door, if the visitor takes his/her hand off from the door, the door may not be completely closed, so that it makes a bad circumstance because dust or cold wind is introduced from the outside to the inside and largely, an outsider may easily invade an inside space through the open door without permission. In this regard, the door closer which automatically and slowly close the open door is installed.

In the door closer used for the above use, a stopper device is installed in the door closer in order to maintain the door in an open state and prevent safety accidents.

This stopper device may fix the door in order that the door which is automatically closed by the door closer is not completely closed, so that it may be usefully used such that the visitor who carry baggage and whose use of both hands is limited enters and exits through the door or the door is maintained in an open state for convenience that inside and outside air are circulated in a boundary of the door and there is ventilation, and the like.

However, the stopper device according to the conventional technologies includes transfer apparatus which has a plastic ring and slides as the door opens and closes, fixing apparatus which has a roller connected to the ring of the sliding transfer apparatus, and a guide rail which guides movement of the transfer apparatus and fixing apparatus, wherein there is a problem that in the ring, an opening is formed at one side thereof in order that the roller may be connected or separated, and when connected to the roller, it is adhered to the outside, and thus a holding portion is small and the ring may not be firmly fixed, and as time goes by, elastic power of the ring is lowered and fixing power is also lowered together, so that it may not properly fix the door.

Also, the ring of the transfer apparatus which slides according to the guide rail gapes open, so that in a process of being connected to or separated from the roller of the fixing apparatus, noise occurs due to friction, and structurally, when adhered to each other, centers are not exactly matched, so that the door and the door closer has a problem that durability is lowered due to shaking phenomena resulting from friction and vibration.

Patent Document: Korean publication of unexamined patent applications No. 10-2019-0023124

SUMMARY OF THE INVENTION

The present disclosure is for solving the problem and has its objective to provide a stopper device of a door closer configured to firmly fix a door to maintain an open state of the door in which the door closer is installed, and in a process that sliding transfer apparatus is connected to or separated from the fixing apparatus, to certainly maintain maintenance of both centers in order that shaking and friction are minimized and occurrence of noise and vibration may be reduced.

In order to achieve the technical problem as the above, the present disclosure includes a guide rail in which a sliding portion is formed inside in order that the transfer apparatus and fixing apparatus are positioned and to which a side cap is coupled at both ends in order that the transfer apparatus and fixing apparatus positioned at the sliding portion are not deviated and which is installed at a door frame, the transfer apparatus in which an arm connection portion to which one side of an arm is connected in order to slide accordingly if the arm connected to the door closer rotates and a roller to which a clip of the fixing apparatus is connected are formed, and the fixing apparatus in which a clip seating groove adhered to one side of the sliding portion of the guide rail is formed in order that the clip which is directly in contact with and is connected to the roller of the transfer apparatus is seated and the seated clip is not deviated and which is fastened with a fixing bolt in order that a position may be controlled within the sliding portion.

Also, the clip seated in the clip seating groove of the fixing apparatus is formed with a ‘T’ shaped seating piece to be fixed without distortion or shaking when seated and an ‘S’ shaped elastic piece which is connected to the seating piece and is divided into the left and the right and faces each other, wherein the roller of the sliding transfer apparatus enters through an opening between facing elastic pieces and a trapping portion surrounds and holds to fix the outside in a center of the roller.

According to the present disclosure, there is an effect of firmly fixing in order that a door in which the door closer is installed and which is automatically closed may be maintained in an open state at a certain angle.

Also, there is an effect that friction occurring in a process that the transfer apparatus sliding as the door is opened or closed is connected to or separated from the fixing apparatus is minimized and occurrence of noise and vibration are reduced.

DETAILED DESCRIPTION OF THE INVENTION

Figure 1:
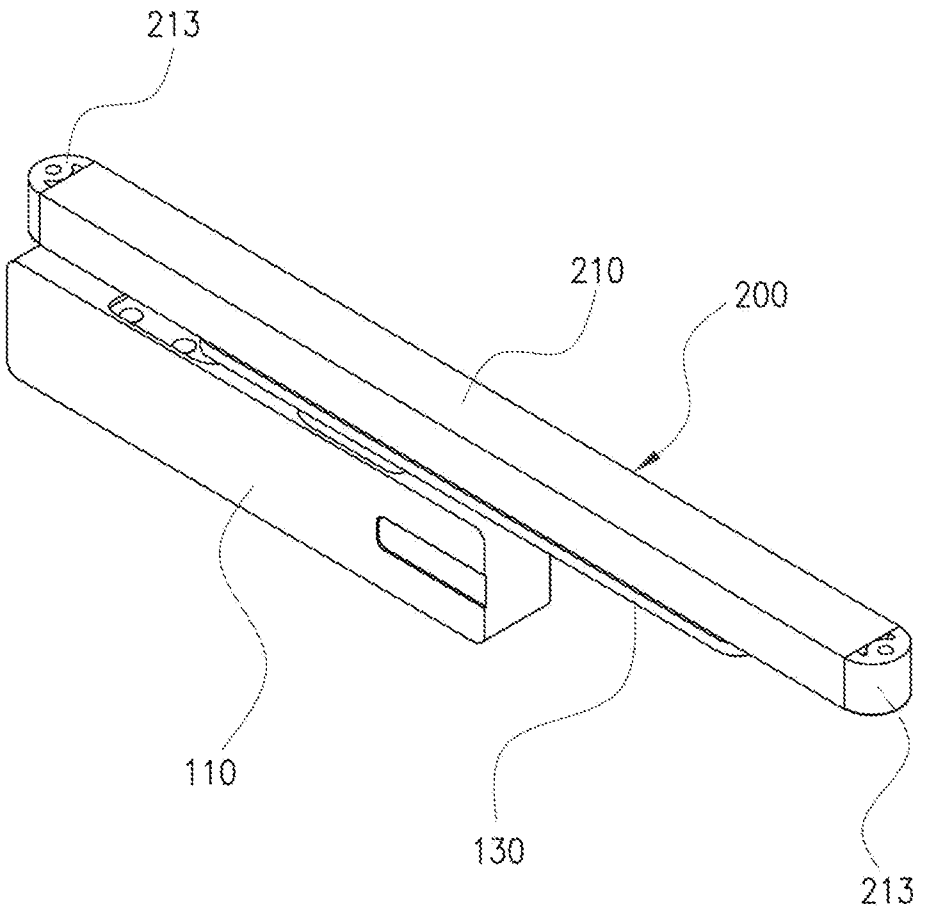
FIG. 1 is a perspective view of a door closer.
Figure 2:
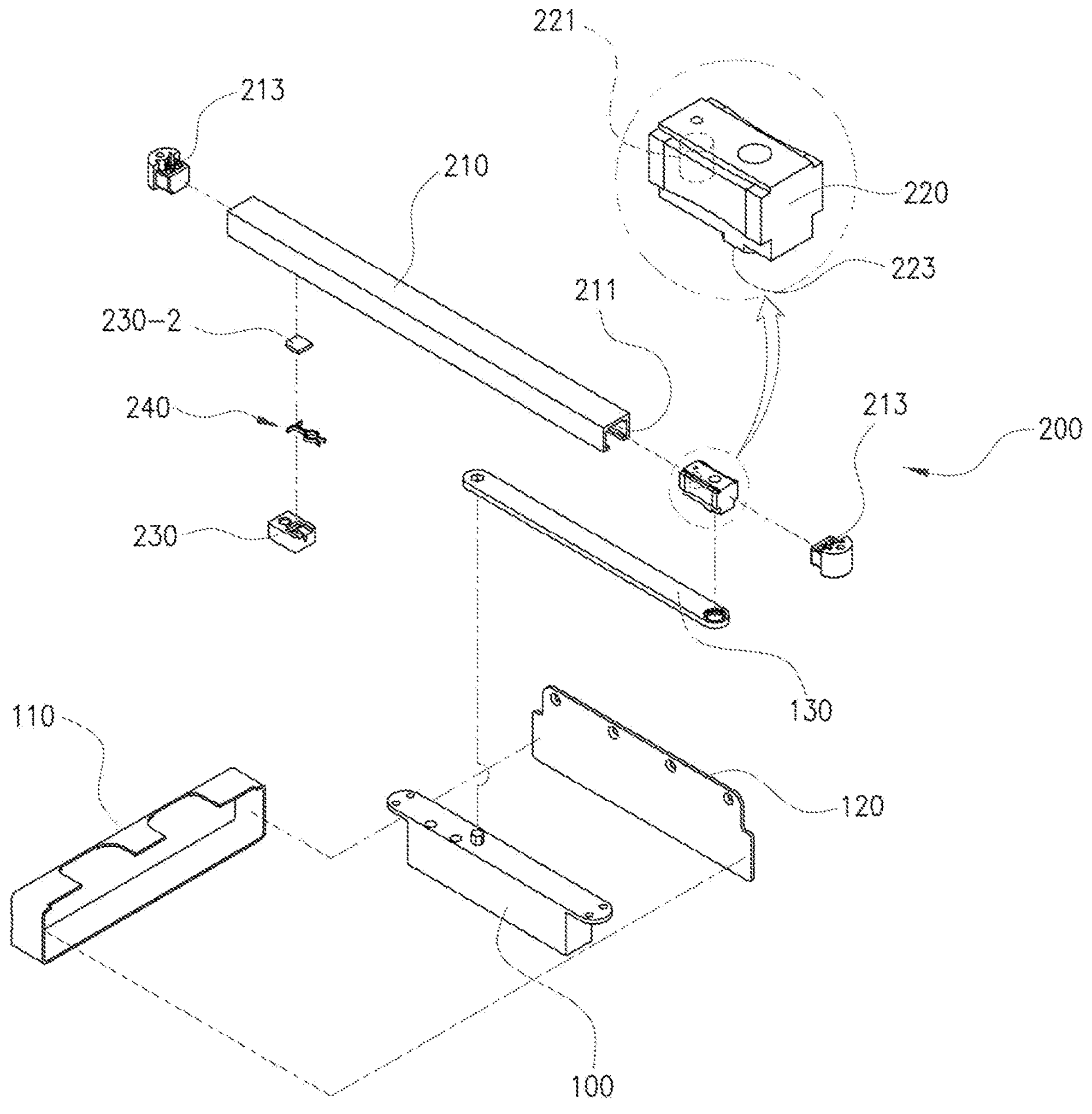
FIG. 2 is an exploded perspective view of the door closer.
Figure 3:
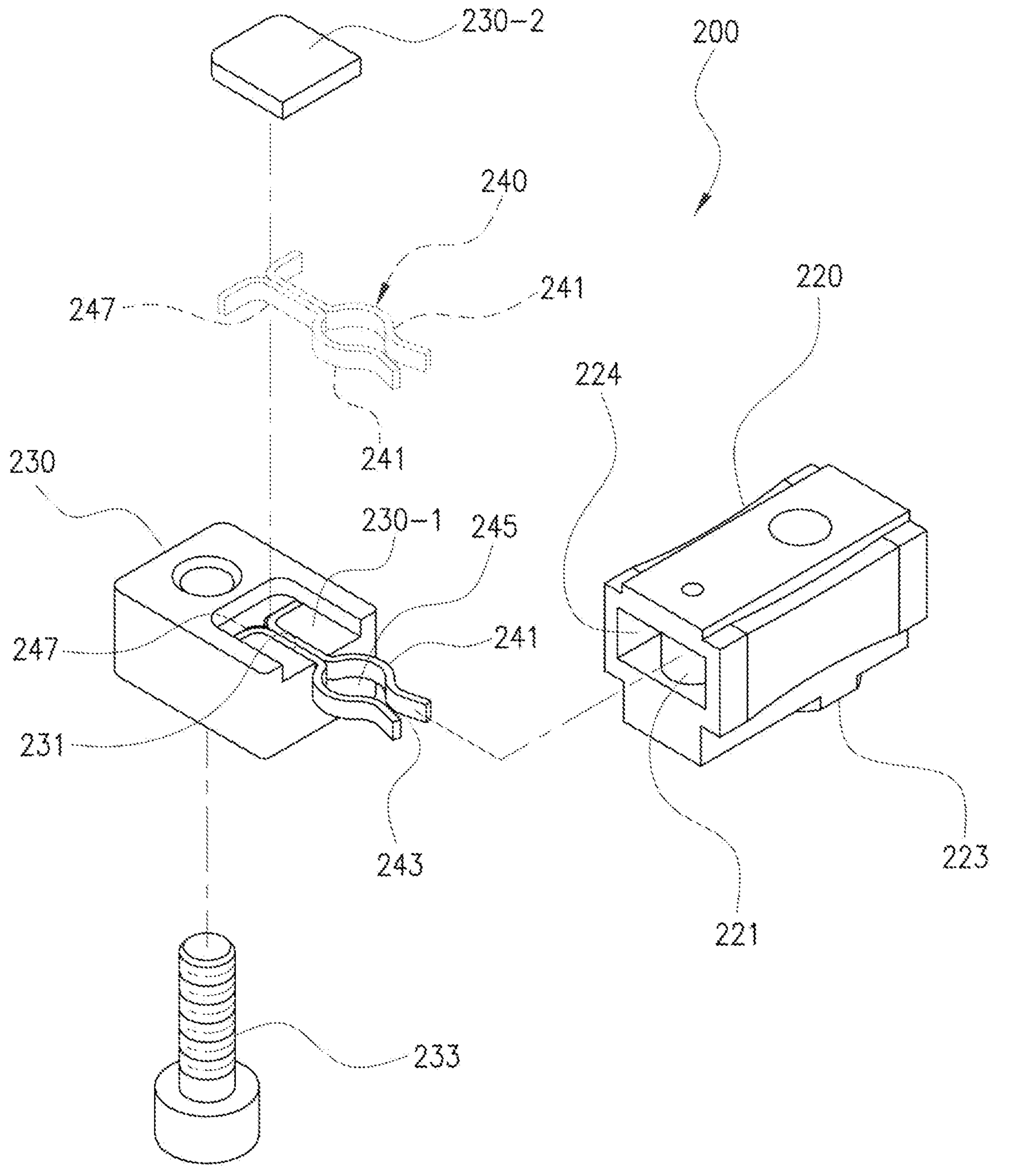
FIG. 3 is an exploded perspective view of fixing apparatus of a stopper device according to the present disclosure.
Figure 4:
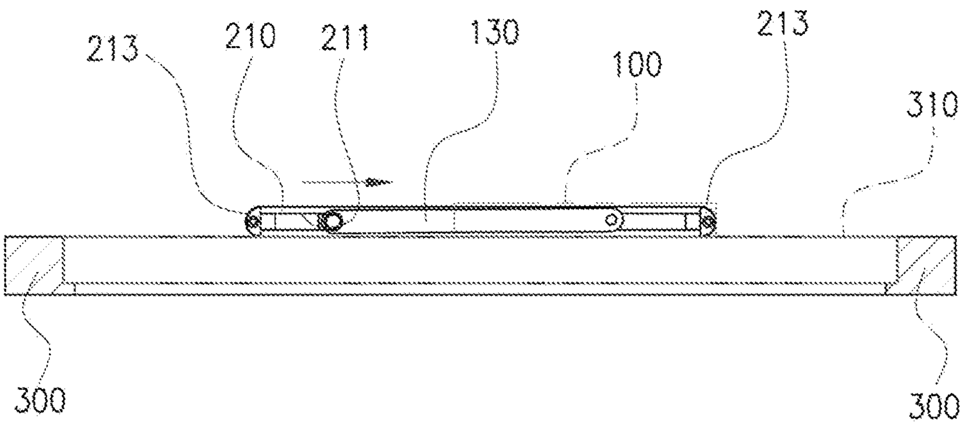
FIG. 4 is a use state view in which the door closer including the stopper device according to the present disclosure is installed at a door.
Figure 5:
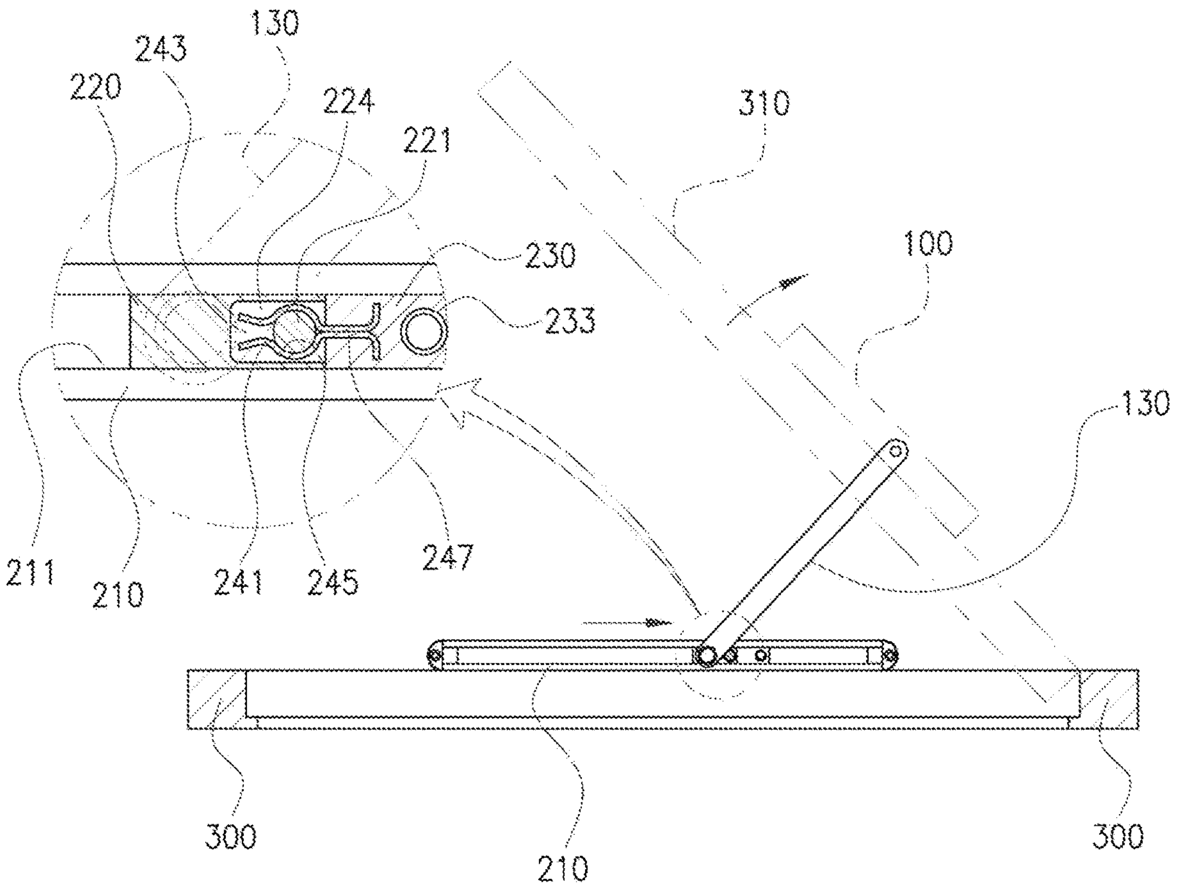
FIG. 5 is a use state view in which the door is fixed in an open state as the transfer apparatus of the stopper device according to the present disclosure slides and is connected to the fixing apparatus.
Figure 6:
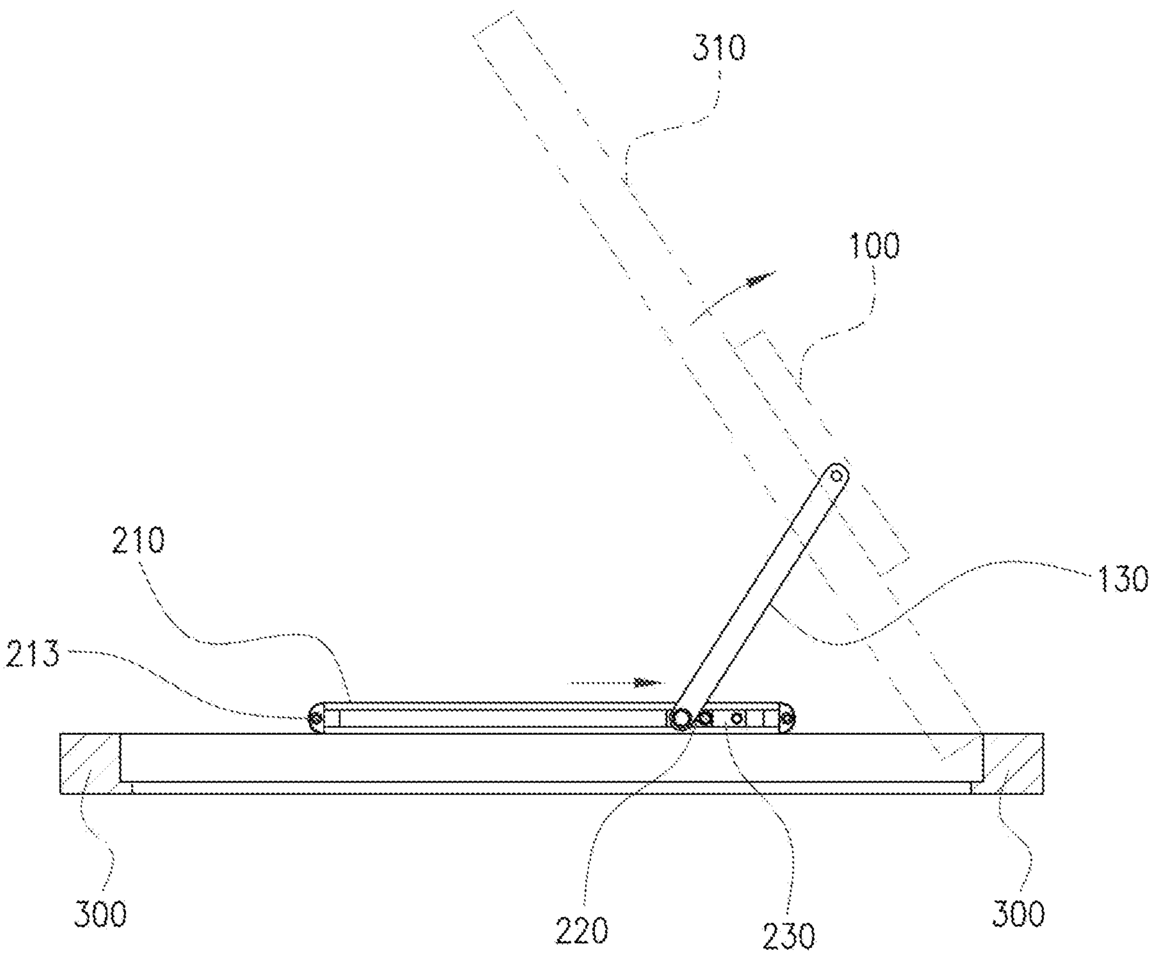
FIG. 6 is a use state view of controlling an angle of the door fixed to maintain the open state when controlling a position of the fixing apparatus of the stopper device according to the present disclosure to connect with the transfer apparatus.

Hereinafter, it should be understood that when a stopper device of a door closer of the present disclosure is specifically described, it is described in a criterion of an example according to the present disclosure, wherein technologies of the present disclosure are not intended to be limited to an embodied form described in the example described in this specification and includes various modifications, equivalents, and/or alternatives of the example of the present disclosure.

In addition, when describing the example of the present disclosure, it is natural that even though an action and effect according to configurations of the present disclosure are not definitely described and explained, predictable effects based on the relevant configurations are to be also recognized.

A stopper device 200 of the present disclosure is installed together with a door closer 100 and is configured to include a guide rail 210, transfer apparatus 220 sliding according to closing and opening of a door, and fixing apparatus 230 fixing the sliding transfer apparatus 220.

The guide rail 210 is installed at an upper side of a door frame 300, and is formed in a longitudinal direction, wherein a sliding portion 211 is formed inside in order that the transfer apparatus 220 and the fixing apparatus 230 may be positioned and slide.

Also, a side cap 213 is formed at ends of both sides in order that the transfer apparatus 220 and fixing apparatus 230 positioned at the sliding portion 211 slide and do not deviate from the guide rail 210.

The transfer apparatus 220 slides by an arm 130 rotating according to opening and closing of a door 310, wherein an arm connection portion 223 to which the arm 130 is connected in order to rotate according to the arm 130 connected to a door closer 100 and a roller 221 to which a clip 240 seated at the fixing apparatus 230 is bound connected to fix the door 310 are formed, wherein the roller 221 is installed in a center of a clip receiving space 224.

The fixing apparatus 230 is for fixing the sliding transfer apparatus 220, wherein a clip seating groove 231 adhered to one side of the sliding portion 211 is formed in order that a clip 240 is seated to be directly connected and fixed to the roller 221 of the transfer apparatus 220 and the seated clip 240 is prevented from deviating.

Also, a fixing bolt 233 is fastened in order that an angle at which the door 310 maintaining a fixed and open state is opened may be controlled by controlling a position of the fixing apparatus 230 within the sliding portion 211 to control a whole moving distance of the sliding transfer apparatus 220.

The clip 240 is coupled to the fixing apparatus 230, wherein a 'T' shaped seating piece 247 is formed in order to be seated at the clip seating groove 231 of the fixing apparatus to be firmly fixed without distortion or shaking and an elastic piece 241 which is connected to the seating piece 247 and is exposed at the front of the clip seating groove 231 is formed. The fixing apparatus 230 is configured to form a cover seating portion 230-1 in order to put the clip 240 configuring the fixing apparatus into the clip seating groove 231 and prevent it from escaping and at the same time, fit a position with the roller 221 of the transfer apparatus and to couple a cover 230-2 thereto.

Also, the elastic piece 241 is formed to have a 'S' shape, be divided into the left and the right and face each other, wherein an opening 243 is formed at the front in order that the roller 221 of the sliding transfer apparatus 220 enters or exits and a trapping portion 245 is formed at the back of the opening 243 in order to hold an outer circumference of the roller 221 entering through the opening 243.

When specifically referring to an action about the stopper device of the door closer according to the present disclosure configured as the above, the content is as follows.

At the door 310 in which the door closer is installed, a case 110 covering a door closer 100, a plate 120 having a role of a stiffening plate to install at the door 310, and the door closer 100 which includes the arm 130 rotating according to opening and closing of the door 310 are installed, wherein after opening the door 310, if a visitor takes his/her hand off, the arm 130 rotates by a repulsive force of the door closer 100 and the open door 310 is slowly closed. Its structure is generally used, and thus specific description is omitted.

The stopper device 200 of the present disclosure is installed at an upper end of the door frame 300 in order that the arm 130 of the door closer 100 installed at the door 310 is easily connected and rotates as the above.

The stopper device 200 installed in this way rotates by the arm 130 connected to the door closer 100 as the door 310 opens and closes, and fixes the door 310 in order to maintain it in an open state at a certain angle when needed, More specifically, the arm 130 connected to the door closer 100 rotates according to the door 310 which is opened by pushing to open the closed door 310, and the transfer apparatus 220 connected to one side of the rotating arm 130 slides in a hinge direction of the door 310 within the sliding portion 211 of the guide rail 210.

In this way, the arm 130 rotates as the door 310 is opened, and according to the rotating arm 130, the transfer apparatus 220 slides along the guide rail 210 toward the fixing apparatus 230 of which a position is fixed by the fixing bolt 233.

The transfer apparatus 220 sliding in a direction at which the fixing apparatus 230 is positioned is connected to the fixing apparatus 230 at some time and fix the door 310.

More specifically, if the roller 221 of the sliding transfer apparatus 220 is coupled to the fixing apparatus 230 and touches the elastic piece 241 of the protruded clip 240, the elastic piece 241 gapes open and the roller 221 passes through the opening 243 between the gaping elastic pieces 241 and slides up to the trapping portion 245.

The roller 221 sliding to the trapping portion 245 in this way has strong bearing power and is prevented from shaking because the elastic piece 241 positioned at the trapping portion 245 is formed to surround the outside in a center of the roller 221 and holds the transfer apparatus 220 not to slide any more, and the fixing apparatus 230 and transfer apparatus 220 are adhered and support each other.

Also, due to the above, the arm 130 connected to the arm connection portion 223 of the transfer apparatus 220 does not also rotate, and thus fixing the door 310 in an open state is maintained.

Further, if a position of the fixing apparatus 230 fixed to the sliding portion 211 of the guide rail 210 with the fixing bolt 233 is controlled to reduce or extend a whole moving distance from the transfer apparatus 220, an angle at which the door 310 fixed to maintain an open state when the transfer apparatus 220 is connected to the fixing apparatus 230 is opened may be controlled and fixed to be close to an aright angle in a criterion of the door frame 300 or at any angle.

As the above, the elastic piece 241 which is divided into the left and the right and faces each other surrounds and holds the outside in a center of the roller 221, the transfer apparatus 220 and fixing apparatus 230 are adhered to each other to be stably fixed, and in a process that the transfer apparatus 220 and fixing apparatus 230 are connected or separated, friction occurring due to direct contact is minimized and thus, noise and vibration may be reduced.

DESCRIPTION OF SYMBOLS

100: Door closer
110: Case
120: Plate
130: Arm
200: Stopper device
210: Guide rail
211: Sliding portion
213: Side cap
220: Transfer apparatus
221: Roller
223: Arm connection portion
230: Fixing apparatus
231: Clip seating groove
233: Fixing bolt
240: Clip
241: Elastic piece
243: Opening
245: Trapping portion
247: Seating piece
300: Door frame
310: Door

What is claimed is:

1. A stopper device configured to fix a door in which a door closer is installed to be maintained in an open state, wherein the stopper device of the door closer comprises:

a guide rail in which a sliding portion is formed inside in order that transfer apparatus and fixing apparatus are positioned and slide and a side cap is coupled at both ends in order that the transfer apparatus and fixing apparatus positioned at the sliding portion do not deviate, the transfer apparatus in which an arm connection portion to which one side of an arm connected to the door closer is connected and a roller to which a clip of the fixing apparatus is connected and fixed are formed and which slides along the arm rotating by opening and closing of the door, and the fixing apparatus in which a clip seating groove adhered to one side of the sliding portion of the guide rail is formed in order that the clip which is directly connected and fixed to the roller of the transfer apparatus is seated and the seated clip is prevented from deviating and to which a fixing bolt is fastened in order to control a position within the sliding portion of the guide rail.

2. The stopper device of the door closer of claim 1, wherein the clip is formed with a 'T' shaped seating piece to be firmly fixed to the clip seating groove of the fixing apparatus without distortion or shaking and a 'S' shaped elastic piece which is connected to the seating piece and is divided into the left and the right and faces each other, wherein an opening through which the roller of the transfer apparatus enters or exits with the elastic piece and a trapping portion which surrounds and holds an outer circumference in a center of the roller which enters through the opening are formed.

* * * * *